(12) United States Patent
Oyama et al.

(10) Patent No.: US 6,374,146 B1
(45) Date of Patent: Apr. 16, 2002

(54) COMPONENT SUCTION SITE-TEACHING SYSTEM AND METHOD

(75) Inventors: Kazuyoshi Oyama, Tochigi-ken; Hideaki Fukushima, Gunma-ken; Kazuyoshi Ieizumi, Gunma-ken; Shigeru Kuribara, Gunma-ken, all of (JP)

(73) Assignee: Sanyo Electric Co., Ltd., Osaka-fu (JP)

( * ) Notice: Subject to any disclaimer, the term of this patent is extended or adjusted under 35 U.S.C. 154(b) by 0 days.

(21) Appl. No.: 09/350,979

(22) Filed: Jul. 9, 1999

(30) Foreign Application Priority Data

Jul. 10, 1998 (JP) ............................................. 10-196037

(51) Int. Cl.⁷ .................... G05B 19/18; G06F 19/00; H05K 3/30; G06K 9/00
(52) U.S. Cl. ................... 700/59; 700/114; 700/121; 700/193; 29/833; 382/145
(58) Field of Search ............................. 700/59, 66, 121, 700/193, 220, 259, 114; 29/740, 833; 414/752.1; 382/145–148, 151; 356/391–394

(56) References Cited

U.S. PATENT DOCUMENTS

| | | | | |
|---|---|---|---|---|
| 4,891,767 A | * | 1/1990 | Rzasa et al. ................ | 700/259 |
| 4,971,554 A | * | 11/1990 | Moore ........................ | 432/19 |
| 5,038,380 A | * | 8/1991 | Morimoto et al. .......... | 382/151 |
| 5,046,022 A | | 9/1991 | Conway et al. | |
| 5,189,707 A | | 2/1993 | Suzuki et al. | |
| 6,041,494 A | * | 3/2000 | Mimura et al. ............. | 29/832 |
| 6,230,393 B1 | * | 5/2001 | Hirano et al. ............... | 29/740 |

FOREIGN PATENT DOCUMENTS

| | | |
|---|---|---|
| EP | 0 650 319 A | 4/1995 |
| EP | 0 727 934 A | 8/1996 |

* cited by examiner

Primary Examiner—William Grant
Assistant Examiner—Elliot Frank
(74) Attorney, Agent, or Firm—Darby & Darby

(57) ABSTRACT

There are provided a component suction site-teaching system and method for an electronic component-mounting apparatus including a vacuum nozzle having a nozzle end face for picking up an electronic component thereat by vacuum. The vacuum nozzle is moved in directions of X axis and Y axis. An image of the electronic component set at a pickup position is taken. A graphical image of the nozzle end face of the vacuum nozzle is created from shape data of the vacuum nozzle. The image of the electronic component taken by the image taking means and the graphical image of the nozzle end face created by the image creating means, are displayed on a screen such that the graphical image of the nozzle end face is superimposed on the image of the electronic component. The image of the electronic component and the graphical image of the nozzle end face are moved relative to each other on the screen of the display means, thereby effecting alignment of the graphical image of the nozzle end face with an image of a predetermined site of the electronic component. A location of the predetermined site of the electronic component the image of which has been aligned with the graphical image of the nozzle end face by the image control means, is taught to nozzle moving means for moving the vacuum nozzle, as a location of a suction site of the electronic component to be sucked by the vacuum nozzle.

12 Claims, 9 Drawing Sheets

FIG. 3A

DATA ENTRY SCREEN(NOZZLE TYPE DATA)

| SHAPE | | CIRCLE | NOZZLE HOLE(3) | LONGITUDINAL DIMENSION(X) | 0.00mm |
|---|---|---|---|---|---|
| NOZZLE LENGTH | | 19.0mm | | TRANSVERSE DIMENSION(Y) | 0.00mm |
| NOZZLE END OUTER DIMENSIONS | X(LONGITUDINAL) | 6.70mm | | LONGITUDINAL DISTANCE(X) | +0.00mm |
| | Y(TRANSVERSE) | 3.50mm | | TRANSVERSE DISTANCE(Y) | +0.00mm |
| NOZZLE HOLE(1) | LONGITUDINAL DIMENSION(X) | 1.80mm | NOZZLE HOLE(4) | LONGITUDINAL DIMENSION(X) | 0.00mm |
| | TRANSVERSE DIMENSION(Y) | 1.80mm | | TRANSVERSE DIMENSION(Y) | 0.00mm |
| | LONGITUDINAL DISTANCE(X) | +2.00mm | | LONGITUDINAL DISTANCE(X) | +0.00mm |
| | TRANSVERSE DISTANCE(Y) | +0.00mm | | TRANSVERSE DISTANCE(Y) | +0.00mm |
| NOZZLE HOLE(2) | LONGITUDINAL DIMENSION(X) | 1.80mm | OFFSET DESIGNATION | X(LONGITUDINAL) | +0.00mm |
| | TRANSVERSE DIMENSION(Y) | 1.80mm | | Y(TRANSVERSE) | +0.00mm |
| | LONGITUDINAL DISTANCE(X) | -2.00mm | END POLARITY | | ABSENCE |
| | TRANSVERSE DISTANCE(Y) | +0.00mm | SIZE OF V-SHAPED GROOVE | | 0.00mm |
| ILLUMINATING METHOD | | TRANSMISSION +REFLECTION | | | |
| LIGHTNESS POLARITY | | LIGHT | | | |

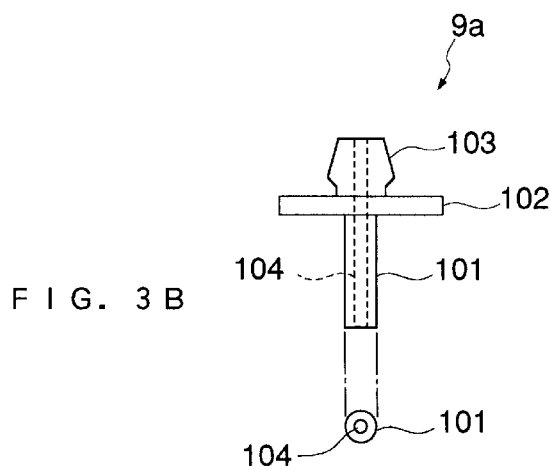

FIG. 3B

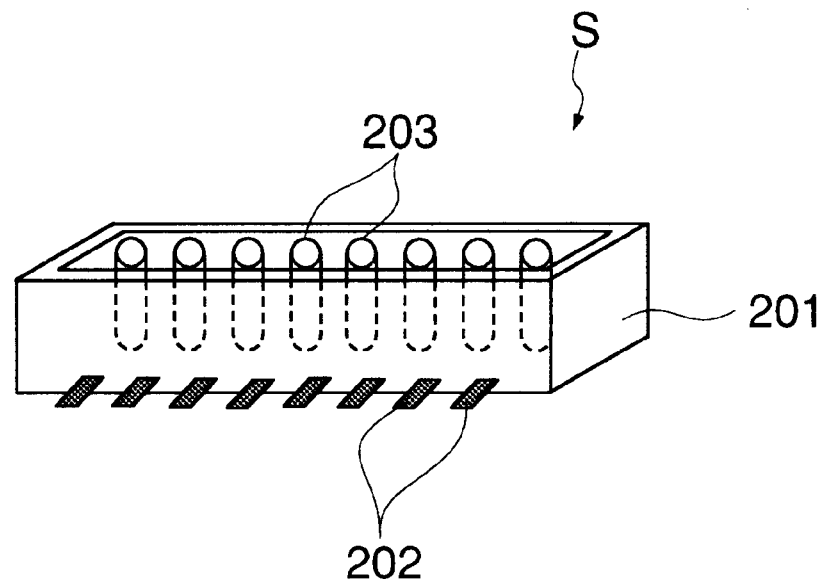
F I G. 4 A
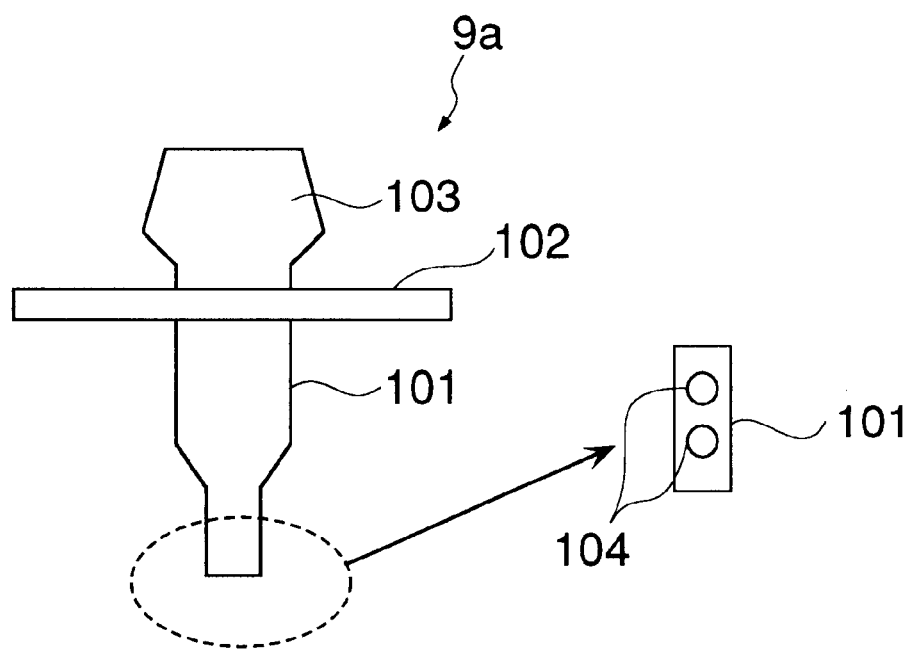
F I G. 4 B

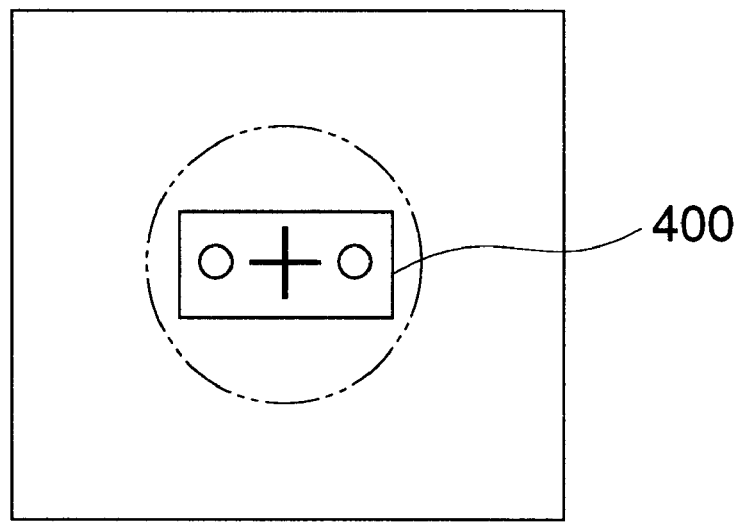
F I G. 7 A
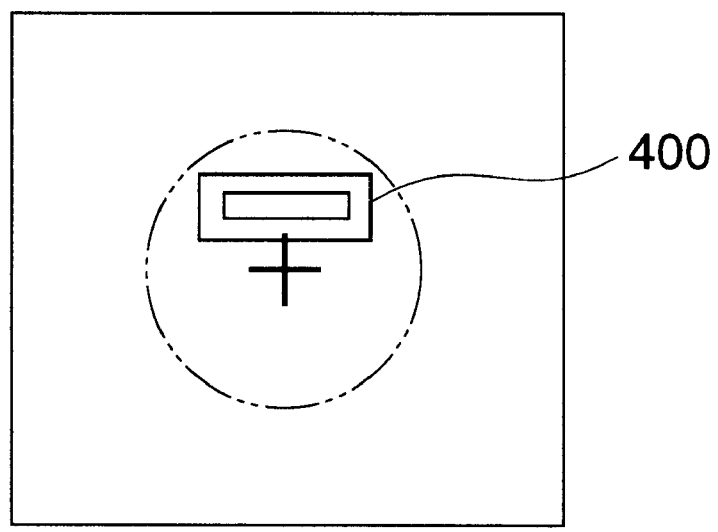
F I G. 7 B

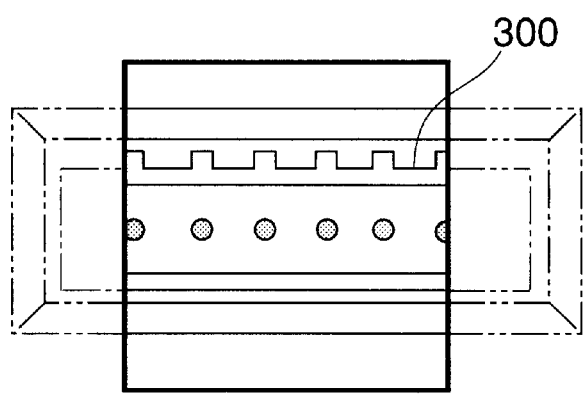
F I G. 9 A
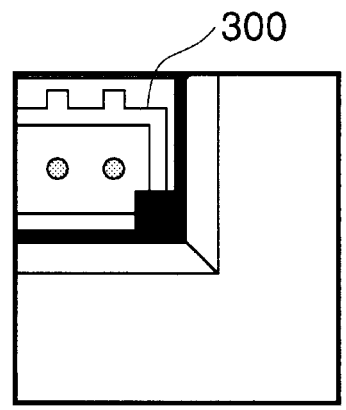
F I G. 9 B
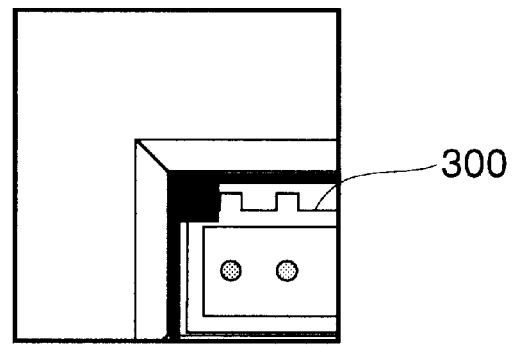
F I G. 9 C
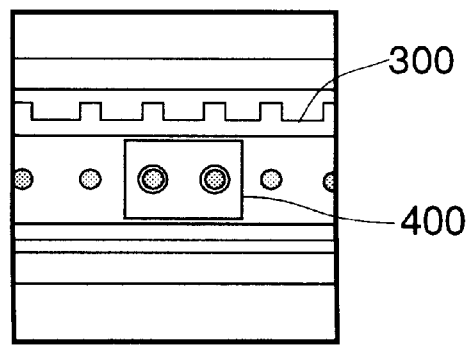
F I G. 9 D

COMPONENT SUCTION SITE-TEACHING SYSTEM AND METHOD

BACKGROUND OF THE INVENTION

1. Field of the Invention

This invention relates to a component suction site-teaching system for teaching a location of a suction site (i.e. a site to be sucked by a vacuum nozzle) of an electronic component supplied to a predetermined pickup position to nozzle moving means for moving the vacuum nozzle.

2. Prior Art

In a mounter (electronic component-mounting apparatus) or the like, electronic components are sequentially fed e.g. in a state carried on a carrier tape to a forward end of a component-feeding device, and vacuum nozzles provided on a main block of the mounting apparatus are brought to a position facing the forward end of the component-feeding device from above, to pick up the electronic components one after another. In this sequential operation, the component-feeding device feeds the electronic components one after another to the pickup position at the forward end thereof with high accuracy. On the other hand, in the main block of the mounting apparatus, each of the vacuum nozzles is moved accurately in X and Y directions and brought to the pickup position. Actually, however, it is impossible to always bring the vacuum nozzle precisely to each electronic component supplied to the pickup position due to inevitable mounting errors of the component-feeding device removably mounted to the main block of the mounting apparatus. So long as the electronic component to be picked up has a large and flat suction surface, no failure of pickup occurs even if the location of a suction site of the electronic component is slightly deviated or offset from design values thereof. However, in picking up another type of electronic component, such as a surface-mount connector component, which has a suction surface thereof formed with asperities and a very small suction site, the slightest deviation of the location of the suction site from its design values may cause a failure of the pickup.

For this reason, in picking up electronic components of this type, the conventional mounter or the like requires the operator to bring the vacuum nozzle close to the electronic component visually align the nozzle with the suction site of the component, and then teach results of the visual alignment to a control system for controlling motion of X-Y stages of the apparatus. In this case, since the component-feeding device is capable of feeding electronic components accurately to the pickup position at the forward end thereof, the above alignment is only required to be carried out for an electronic component on the carrier tape which is first supplied to the pickup position.

However, in the conventional teaching method based on the visual alignment, the operator is required to manually operate the X-Y stages and a lift device to repeatedly move the vacuum nozzle (of the mounting head) in the X and Y directions and lift/lower the same vertically (i.e. in a Z direction), which is very time-consuming and effort-demanding.

SUMMARY OF THE INVENTION

It is a first object of the invention to provide a component suction site-teaching system which is capable of teaching a location of a suction site of an electronic component to be sucked by a vacuum nozzle, with high accuracy and ease.

It is a second object of the invention to provide a component suction site teaching method which is capable of teaching a location of a suction site of an electronic component to be sucked by a vacuum nozzle, with high accuracy and ease.

To attain the first object, according to a first aspect of the invention, there is provided a component suction site-teaching system for an electronic component-mounting apparatus including a vacuum nozzle having a nozzle end face for picking up an electronic component thereat by vacuum, the component suction site-teaching system comprising:

nozzle moving means for moving the vacuum nozzle in directions of X axis and Y axis;

image taking means for taking an image of the electronic component set at a pickup position;

image creating means for creating a graphical image of the nozzle end face of the vacuum nozzle from shape data of the vacuum nozzle;

display means for displaying on a screen thereof the image of the electronic component taken by the image taking means and the graphical image of the nozzle end face created by the image creating means, such that the graphical image of the nozzle end face is superimposed on the image of the electronic component;

image control means for moving the image of the electronic component and the graphical image of the nozzle end face relative to each other on the screen of the display means, thereby effecting alignment of the graphical image of the nozzle end face with an image of a predetermined site of the electronic component; and suction site-teaching means for teaching to the nozzle moving means a location of the predetermined site of the electronic component the image of which has been aligned with the graphical image of the nozzle end face by the image control means, as a location of a suction site of the electronic component to be sucked by the vacuum nozzle.

According to this component suction site-teaching system, the image of the electronic component taken by the image taking means and the graphical image of the nozzle end face generated by the image creating means are superimposed one upon the other and moved relative to each other thereby effecting alignment of the graphical image of the nozzle end face with an image of a predetermined site of the electronic component, and then a location of the predetermined site of the electronic component the image of which has been aligned with the graphical image of the nozzle end face is taught to the nozzle moving means as a location of a suction site of the electronic component to be sucked by the corresponding vacuum nozzle. Therefore, the alignment between the suction site of the electronic component and the end face of the vacuum nozzle can be carried out on screen by using the two images, whereby it is possible to teach to the nozzle moving means a suction site on the electronic component which is determined with high accuracy such that there are no asperities or obstacles existing on a suction surface within the suction site of the component. Further, the operator can carry out the alignment accurately and speedily, based or a representation of the actual positional relationship between the component and the nozzle. It should be noted that the initial position of the graphical image of the vacuum nozzle with respect to the image of the electronic component on the screen may be arbitrary, or may be set based on design value data (i.e. a location of a suction site set before the teaching).

Preferably, the component suction site-teaching system further comprises image-taking center-designating means for designating a design value-designated component center of the electronic component as a center of a field of view of the image taking means when the image taking means takes the image of the electronic component, if there is a fear that an image of the electronic component taken by the image taking means with the center of the field of view of the image taking means set to a design value-designated suction site center of the electronic component may extend of f the field of view of the image taking means.

According to this preferred embodiment, it is possible to start operation for the alignment, on the precondition that the displayed image of the electronic component is an image of an approximately central portion of the electronic component, and at the same time, since the center of the electronic component substantially agrees with that of the screen, it is easy to grasp the total picture of the component. This provides a solution to a conventional problem that when a suction site of an electronic component is deviated or offset far from the center of the electronic component, if an image of the electronic component is taken by the image taking means with the center of the field of view thereof set to the suction site of the component, it is impossible to determine which portion of the whole electronic component is shown by the image of the electronic component, making it difficult to locate the suction site of the component (e.g. when there is a large displacement in location between a design value-defined suction site and an actually-desired or proper suction site). Further, it is possible to prevent faulty sensing of an electronic component by the image taking means from occurring due to displacement of the component from the field of view of the image taking means.

More preferably, the image control means includes center aligning means for moving, on the screen of the display means, the image of the electronic component taken with the center of the field of view of the image taking means set to the design value-designated component center designated by the image-taking center-designating means, thereby effecting alignment between a center of the image of the electronic component and a center of the screen, and the suction site-teaching means teaches to the nozzle moving means the center of the image of the electronic component which is aligned with the center of the screen by the image control means as an actual component center of the electronic component.

According to this preferred embodiment, it is possible to teach an actual component center of the electronic component to the nozzle moving means in advance. This makes it possible to compensate for a minute displacement in location of the suction site in the case of an electronic component having a suction site set to the component center, and on the other hand accurately set the suction site by applying the offset (offset amount) to the actual component center in the case of an electronic component having a suction site thereof offset from the component center.

Preferably, the component suction site-teaching system further comprises component center-calculating means for causing the image taking means to take images of two points at respective diagonally opposed corners of the electronic component, calculating a location of the component center of the electronic component from results of the image-taking of the two points, and then causing the image taking means to take the image of the electronic component with the center of the field of view of the image taking means set to the component center of the electronic component the location of which is determined by the calculation, if there is a fear that an image of the electronic component taken by the image taking means with the center of the field of view thereof set to a design value-designated suction site center of the electronic component may extend off the field of view of the image taking means.

According to this preferred embodiment, even an image of an electronic component which is too large to fit in the field of view of the image taking means can be displayed with a component center thereof in agreement with the screen center. Therefore, it is possible to carry out alignment between the image of the electronic component and a graphical image of a corresponding nozzle with ease whether the electronic component has a suction site thereof located at its component center (correction of a minute displacement is carried out, in this case) or offset from the same.

Preferably, the suction site-teaching means teaches the location of the component center calculated by the component center-calculating means to the nozzle moving means as an actual component center of the electronic component.

According to this preferred embodiment, it is possible to teach an actual component center of the electronic component to the nozzle moving means in advance. This makes it possible to compensate for a minute displacement in location of the suction site in the case of an electronic component having a suction site set to the component center, and on the other hand accurately set the suction site by applying the offset (offset amount) to the actual component center in the case of an electronic component having a suction site thereof offset from the component center.

Preferably, the graphical image of the nozzle end face is fixedly displayed in a central portion of the screen, and the image control means positions the image of the electronic component with respect to the graphical image of the nozzle end face, for the alignment.

This preferred embodiment enables the operator to position the image of the electronic component with respect to the graphical image of the vacuum nozzle while feeling as if the electronic component were moved toward the movable nozzle held in a fixed state, in agreement with the operator's sense of motion of the sight line toward the nozzle. According to this embodiment, it is possible to dispense with processing for calculating the center of the electronic component from the image of the electronic component, which would be required in the case of the image of the electronic component being fixedly displayed in a central portion of the screen.

More preferably, the graphical image of the nozzle end face is displayed such that a point on the graphical image corresponding in location to an axis of the vacuum nozzle agrees with the center of the display screen.

According to this preferred embodiment, even when the vacuum nozzle has a plurality of nozzle holes or a nozzle hole offset from the central axis of the vacuum nozzle, it is possible to carry out the alignment by accurately grasping of the positional relationship between the axis of the nozzle and the nozzle hole(s), so that the operator can perform the aligning operation without feeling any sense of disorder. Further, this embodiment does not require correction of a data-defined position of the vacuum nozzle. Moreover, when the electronic component has a suction site in agreement with a component center thereof, the location of the suction site and the location of the component center can be taught simultaneously.

Preferably, the graphical image of the nozzle end face is formed by at least one of an outline of the nozzle end face and an outline of a nozzle hole.

According to this preferred embodiment, it is possible to use the graphical image flexibly in accordance with a shape of the electronic component. For instance, a different mode of the graphical image can be used in dependence on whether the alignment is required to be carried out with preference to a location of the nozzle hole, or with preference to the nozzle end avoiding asperities formed on a suction surface of the electronic component.

Preferably, the display means is capable of zooming in/out the image of the vacuum nozzle and the graphical image of the electronic component.

According to this preferred embodiment, even alignment requiring extremely high accuracy can be carried out easily by zooming in the images. On the other hand, even if the electronic component (component image) is too large to fit in the screen, it is possible to zoom out the image of the electronic component to display the whole thereof on screen, so that alignment can be carried out without any inconvenience.

Preferably, the component suction site-teaching system further comprises nozzle angle-designating means for designating a predetermined angle of rotation of the vacuum nozzle when the vacuum nozzle is required to be rotated through the predetermined angle about an axis thereof to pick up the electronic component, and the display means displays the graphical image of the nozzle end face after rotating the graphical image of the nozzle end face relative to the image of the electronic component through the predetermined angle designated by the nozzle angle-designating means.

According to this preferred embodiment, it is possible to carry out the alignment by using the graphical image representative of the real vacuum nozzle in its attitude taken immediately before picking up the electronic component, i.e. in a state after rotation. Accordingly, even if the vacuum nozzle is formed e.g. with two nozzle holes or a nozzle hole in the form of a slit, the alignment can be performed in a manner suitable for an attitude or orientation which the vacuum nozzle will assume after rotation for picking up the component.

More preferably, if the nozzle end face is too large for the graphical image thereof to be displayed within the screen of the display means assuming that the display means displays an outline of the nozzle end face, the display means displays only an outline of a nozzle hole of the vacuum nozzle on the screen thereof.

According to this preferred embodiment, it is possible to recognize a location of the nozzle hole on screen clearly, which facilitates the alignment.

To attain the second object, according to a second aspect of the invention, there is provided a method of teaching a suction site of an electronic component to be picked up by vacuum by a vacuum nozzle, the method comprising the steps of:

taking an image of the electronic component set at a pickup position;

creating a graphical image of a nozzle end face of the vacuum nozzle corresponding to the electronic component from shape data of the vacuum nozzle;

displaying the image of the electronic component and the graphical image of the nozzle end face on a screen, such that the graphical image of the nozzle end face is superimposed on the image of the electronic component;

moving the image of the electronic component and the graphical image of the nozzle end face relative to each other on the screen, thereby effecting alignment of the graphical image of the nozzle end face with an image of a predetermined site of the electronic component; and teaching a location of the predetermined site of the electronic component the image of which site has been aligned with the graphical image of the nozzle end face, as a location of a suction site of the electronic component to be sucked by the vacuum nozzle, to nozzle moving means for moving the vacuum nozzle.

According to this component suction site-teaching method, the image of the real electronic component fed to the pickup position is captured to be displayed on the screen of the display means, then the image of the electronic component and the graphical image of the corresponding vacuum nozzle generated separately from the image of the electronic component are superimposed one upon the other for alignment or positioning between the two images, and results of the alignment are taught to the nozzle moving means in a feedback manner. Therefore, operation for teaching the location of the suction site of the component can be carried out easily and speedily, and with extremely high accuracy.

The above and other objects, features, and advantages of the invention will become more apparent from the following detailed description taken in conjunction with the accompanying drawings.

BRIEF DESCRIPTION OF THE DRAWINGS

FIG. 3A is a diagram showing an example of a data entry screen displayed on a touch panel for entering nozzle type data;

FIG. 3B is a side view of the vacuum nozzle, which is useful in explaining a method of entering the nozzle type data;

FIG. 4A is a perspective view showing a structure of a surface-mount connector component to be picked up;

FIG. 4B is a view showing a structure of a vacuum nozzle for picking up the FIG. 4A connector component;

FIGS. 7A and 7B each show the positional relationship between a center of a graphical image and a center of the monitor screen;

FIGS. 9A to 9D are views each showing an image displayed on the monitor screen, which is useful in explaining a procedure of operations carried out according to a second teaching method of the embodiment.

DETAILED DESCRIPTION

The invention will now be described in detail with reference to drawings showing an embodiment thereof.

Figure 1:
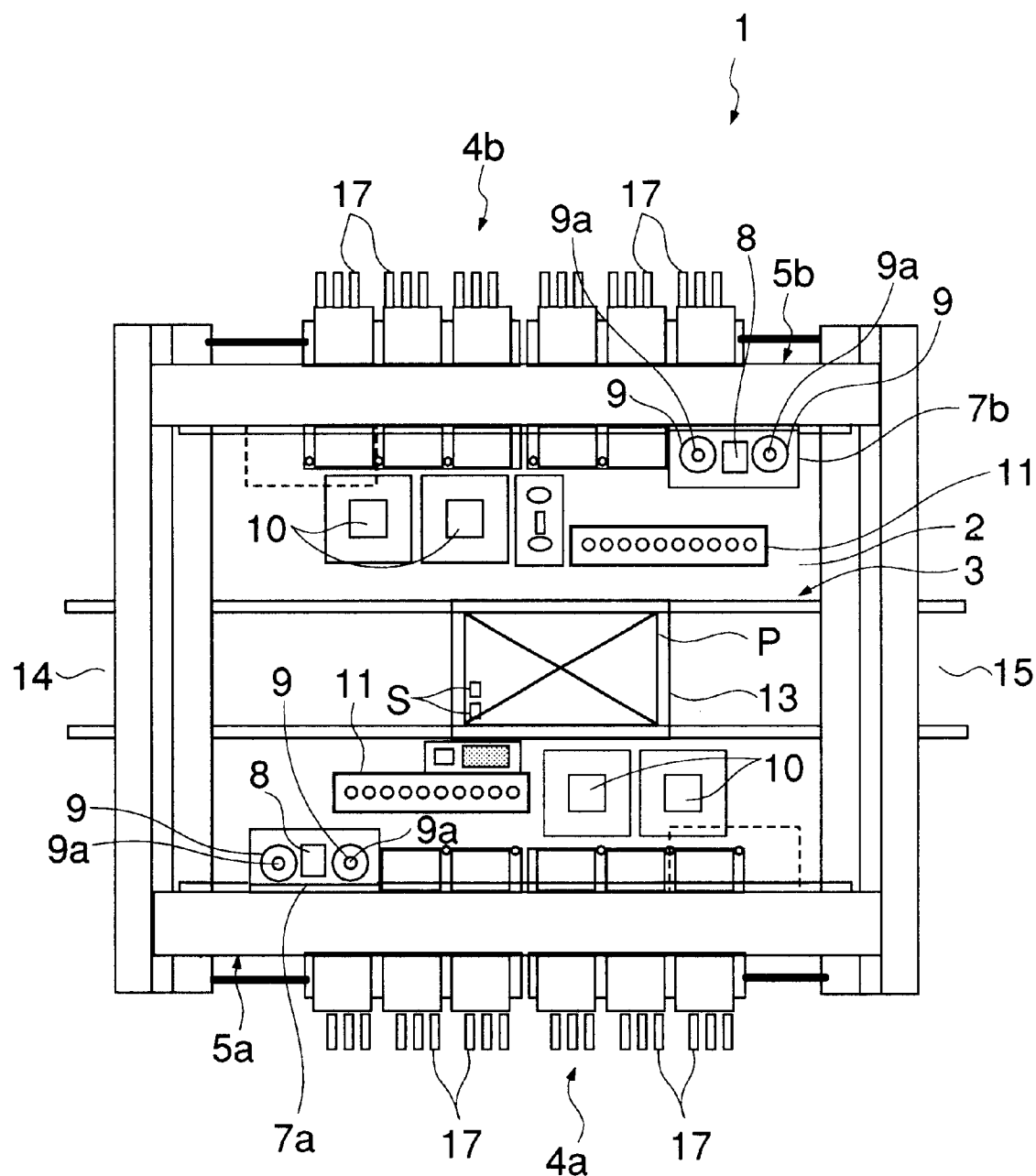
FIG. 1 is a plan view of an electronic component-mounting apparatus incorporating a component suction site-teaching system according to an embodiment of the invention.

Referring first to FIG. 1, there is shown an electronic component-mounting apparatus incorporating a component suction site-teaching system according to the embodiment of the invention. This electronic component-mounting apparatus is a so-called multi-function chip mounter used for mounting various kinds of electronic components, such as circuit elements including chip capacitors, chip resistances, etc., multi-lead components including QFPS, SOPs, etc., and BGAs and other grid array type elements.

As shown in FIG. 1, the electronic component-mounting apparatus 1 is comprised of a base 2, a conveyor 3 extending longitudinally (in a left-right direction as viewed in the figure) on a transversely central area of the base 2, a first electronic component-feeding block 4a arranged at a front end (lower end as viewed in the figure) of the base 2, a second electronic component-feeding block 4b arranged at a rear end (upper end as viewed in the figure) of the base 2, and first and second X-Y stages 5a, 5b arranged such that they are movable to and from the front and rear ends of the base 2, respectively.

The first X-Y stage 5a has a first head unit 7a installed thereon, and similarly, the second X-Y stage 5b has a second head unit 7b installed thereon, for picking up and mounting electronic components. Each of the head units 7a, 7b has a board-sensing camera 8 and two mounting heads 9, 9 mounted thereon. At the bottom of each of the mounting heads 9, 9, there is removably mounted a vacuum nozzle 9a having a shape corresponding to a shape of an electronic component S to be picked up. Further, two pairs of component-sensing cameras 10 and two nozzle storage devices 11, 11 are arranged on the base 2 at respective locations on transversely opposite sides of the conveyor 3. The component-sensing cameras 10, 10 and the nozzle storage device 11 arranged in the front part of the base 2 correspond to the first head unit 7a, while the component-sensing cameras 10, 10 and the nozzle storage device 11 arranged in the rear part of the base 2 correspond to the second head unit 7b.

The conveyor 3 includes a board-setting table 13 located in the center thereof, a supply passage 14 located on the left side thereof, and a delivery passage 15 located on the right side thereof, as viewed in the figure. Each circuit board P is supplied to the table 13 via the supply passage 14, and immovably set at a predetermined location on the table 13 at a predetermined level to have electronic components S mounted thereon. The circuit board P having the electronic components S mounted thereon is delivered via the delivery passage 15.

On the first and second component-feeding blocks 4a, 4b, there are arranged a lot of tape cassettes 17 in parallel with each other. Each tape cassette 17 contains a carrier tape, not shown, which carries electronic components S thereon. The electronic components S are supplied one by one to a forward end of each of the component-feeding blocks 4a, 4b for being picked up. The electronic component-mounting apparatus 1 is supplied with electronic components S, which are relatively small in size, such as surface-mount components, at the first and second component-feeding blocks 4a, 4b, and electronic components S, which are relatively large in size, at a component-feeding block of a tray type, not shown. Normally, the first X-Y stage 5a and the second X-Y stage 5b are alternately operated.

For example, when the first X-Y stage 5a is operated to mount electronic components S, it brings the first head unit 7a thereon to the first component-feeding block 4a (or another component-feeding block), and then the mounting head 9 is lowered to pick up a predetermined one of the electronic components S by the vacuum nozzle 9a. After the component S is picked up by the nozzle 9a, the mounting head 9 is lifted to a predetermined level, and then brought to the component-sensing camera 10, where the electronic component S is sensed by the camera 10 for correction of its attitude. Further, the first head unit 7a is moved to a predetermined location above the circuit board P. Then, after a reference position with reference to which the electronic component S is mounted on the circuit board P is sensed (corrected), the electronic component S is mounted on the circuit board P based on NC data.

Before the mounting of the electronic component S, correction of a position of the electronic component S with respect to the mounting head 9 (in both X and Y directions as well as in angle θ (Z direction)) is carried out based on results of the sensing by the component-sensing camera 10. Further, correction of a position of the nozzle 9a of the mounting head 9 with respect to a mounting position on the circuit board P at which the electronic component S is to be mounted is carried out based on results of the sensing by the board-sensing camera 8.

In this apparatus 1, the tape cassettes 17 are each arranged on the first and second component-feeding blocks 4a, 4b in a manner removable from the base 2, so that a position of each electronic component S at a forward end of the tape cassette 17 from which the electronic component S is to be picked up does not necessarily agree with a design position of a vacuum nozzle 9a employed for picking up the electronic component S, with accuracy. More specifically, there can occur a slight displacement between the design position (pickup position) of the end (nozzle hole) of the nozzle 9a and a suction site of the electronic component S with which the end of the nozzle 9a is to be brought into contact. The displacement does not matter in picking up a normally-shaped electronic component S such as a QFP, a chip, etc. However, if the displacement occurs in picking up a specially-shaped electronic component S, such as a surface-mount connector component having a suction surface thereof formed with asperities and a very small suction site, the asperities can get in the way of the nozzle 9a, thereby causing a failure of picking up the electronic component S. Further, since the electronic components S carried on the carrier tape are accurately supplied one by one to the identical location of the forward end of the component-feeding block 4a or 4b, the displacement between the position of an initially supplied electronic component S and that of the corresponding nozzle 9a consecutively causes failure in picking up the following components S.

According to the present embodiment, when the tape cassette 17 is required to be replaced with a new one or newly mounted e.g. due to a change in a mounting plan or the like, a (specially-shaped) electronic component S initially supplied by the carrier tape of the new tape cassette 17 to the pickup position (the forward end position of the component-feeding device) is aligned again with a corresponding one of the vacuum nozzles 9a to correct (or update) design values or immediately preceding correction values (i.e. data of the pickup position of the nozzle 9a). More specifically, first, an image of the electronic component S on the pickup position at the forward end of the tape cassette 17 is taken by using the board-sensing camera 8 which is movable, in this case, and then the image is displayed on a screen of a monitor 64 (described hereinafter). At the same time, a graphical image of an end face of the nozzle 9*a* is created from nozzle type data (described hereinafter), and superimposed upon the component image of the component S on the screen of the monitor 64. Then, the component image is moved by operating a mouse or a track ball 66 (described hereinafter) for alignment with the graphical image of the nozzle end face. In short, a portion (suction site) of the electronic component S to be sucked is aligned with a nozzle hole of the corresponding vacuum nozzle 9*a* on screen. Then, results of the alignment are taught to a control system of the X-Y stage 5*a* (5*b*) for update of the design values. Of course, the results of the alignment may be adopted as design values without providing the design values in advance.

Figure 2:
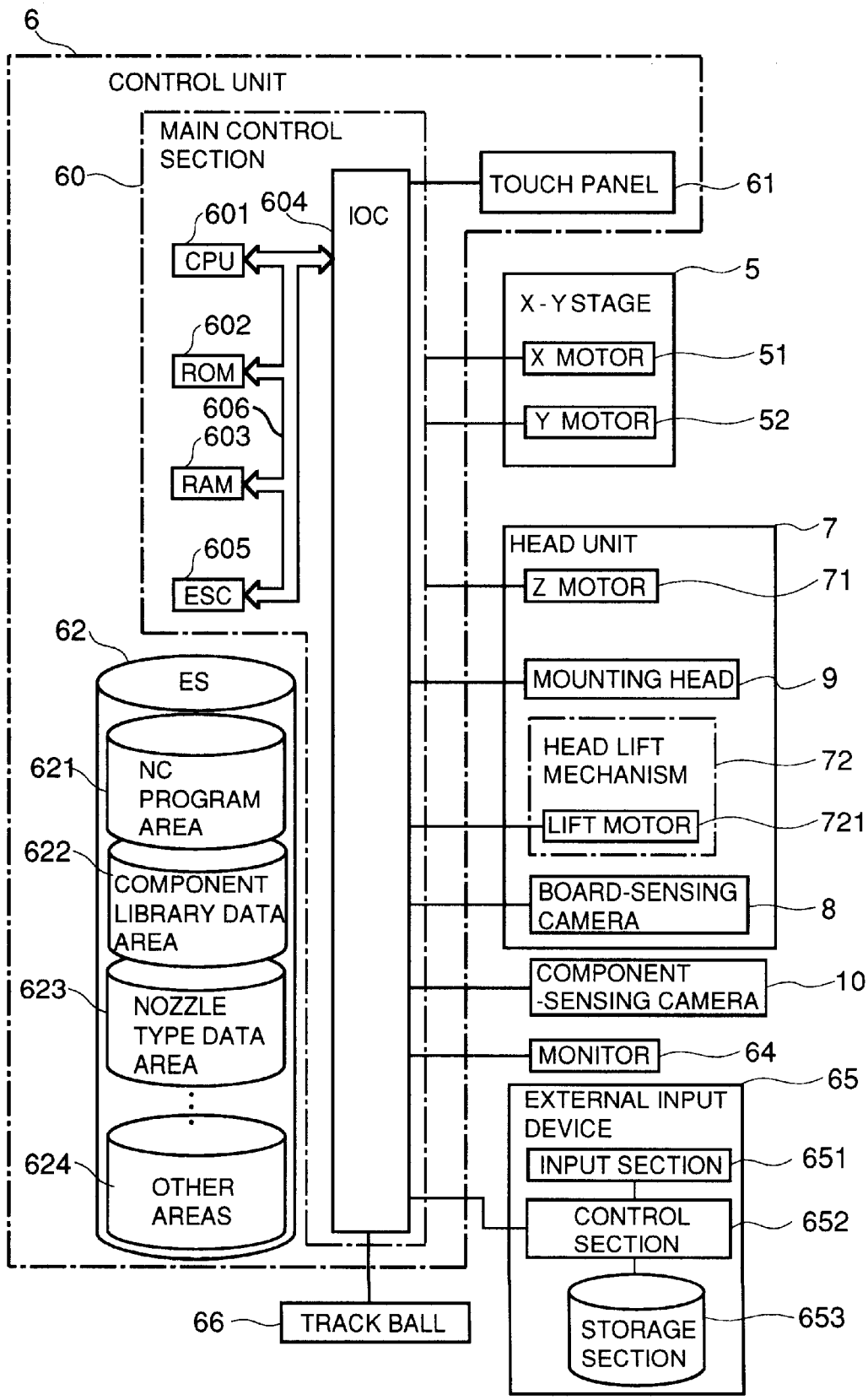
FIG. 2 is a block diagram showing a control system of the FIG. 1 electronic component-mounting apparatus, mainly associated with the component suction site-teaching system according to the embodiment.

Next, the control system of the electronic component-mounting apparatus 1 which is capable of carrying out the above teaching method will be described in detail with reference to FIG. 2. It should be noted that the following description will be made by referring to one of the first and second X-Y stages 5*a*, 5*b* (hereinafter simply referred to as "the X-Y stage 5") and one of the first and second head units 7*a*, 7*b* (hereinafter simply referred to as "the head unit 7"). As shown in the figure, the control unit 6 is comprised of a main control section 60, a touch panel 61, and an external storage device (ES) 62 such as a hard disk, an magneto-optical disk, etc.

The ES 62 includes a numerical control (NC) program area 621 storing an NC control program, a component library data area 622 storing component library data, a nozzle type data area 623 storing nozzle type data, described in detail hereinafter, concerning the vacuum nozzle 9*a*, and other areas 624 storing other various kinds of programs and data. The component library data contains data of electronic components together with data of ID numbers which represent types of vacuum nozzles respectively corresponding to the electronic components, as described in detail hereinafter. That is, by retrieving component library data associated with a component to be mounted before actual mounting of the component, the type of a vacuum nozzle corresponding to the component is selected or determined automatically, and then replacement of a mounted vacuum nozzle 9*a* with the selected one is carried out by using the nozzle storage device 11. Further, a graphical image of the nozzle 9*a*, referred to hereinbelow, is created from the component library data and the nozzle type data.

The main control section 60 is comprised of a CPU 601, a ROM 602, a RAM 603, an I/O controller (IOC) 604, and an external storage controller (ESC) 605, all of which are connected to each other by an internal bus 606. The ROM 602 stores various control programs for carrying out screen display processing, graphical image-generating processing for generating a graphical image as described above, and so forth, and other programs e.g. for starting up the system. The RAM 603 serves as internal storage means for the main control section 60, which is used as a buffer or the like for storing e.g. a component image taken by the board-sensing camera 8.

The IOC 604 is connected to an X motor 51 and a Y motor 52 for moving the X-Y stage 5 in the X and Y directions, respectively, the mounting head 9 of the head unit 7, a Z motor 71 for correcting motion of the mounting head 9 in the Z direction (direction of rotation), a lift motor 721 included in a head lift mechanism 72 for lifting and lowering the mounting head 9, the board-sensing camera 8, the component-sensing camera 10, the touch panel 61 included in the control unit 6, the monitor 64, a control section 652 of an external input device 65 outside the electronic component-mounting apparatus 1, and another peripheral device such as the track ball (or mouse) 66. The IOC 604 controls input/output of various control signals and data between the peripheral and external devices and the main control section 60 in response to instructions from the CPU 601. The ESC 605 drives/controls the ES 62 in response to instructions from the CPU 601, to thereby control input/output of various control signals and data between the ES 62 and the main control section 60.

The CPU 601 executes graphical image-generating processing, component-mounting processing, and other data processing required for the electronic component-mounting apparatus 1, by the use of a work area of the RAM 603, a save area of the ES 62, etc., based on programs stored in the ROM 602, control programs stored in the ES 62, and so forth, and controls the whole apparatus 1 via the IOC 604 and the ESC 605.

The external input device 65 includes an input section 651 similar to the touch panel 61 described in detail below, the control section 652 similar to the main control section 60, and a storage section 653 similar to the ES 62, and allows operations for entering data such as the component library data, the nozzle type data, etc. in place of the control unit 6. The external input device 65 is connected to the control unit 6 via a network which allows data communication (transmission/reception). That is, although in the following description, the electronic component-mounting apparatus 1 is assumed to incorporate a component data input device (also as part of the control unit 6) in the main block thereof, the component data input device may be configured similarly to the external input device 65 such that it can be connected to the apparatus 1 via communication means. Further, when the ES 62 is a removable storage medium, such as a magneto-optical disk which is removable from the main block of the apparatus 1, it is possible to store, in the removable storage medium set in the external input device 65 which serves as a component data input device, various data entered via the external input device 65, and then mount the removable storage medium in the apparatus 1 as the ES 62 of the control unit 6. In this case, the various data entered via the external input device 65 can be utilized as data for the apparatus 1 without any help of communication means.

The touch panel 61 is data entry/edit/display means which allows the operator to enter various instructions and data simply by touching an data entry screen thereof and then edit them. Further, the touch panel 61 displays various error messages and so forth. Especially in the present embodiment, the operator can use the data entry screen of the touch panel 61 to specify an operating procedure for the teaching of a location of a suction site of an electronic component, which will be described hereinafter. In this operation, a component image of the electronic component taken by the board-sensing camera 8 and a created graphical image of a corresponding vacuum nozzle are displayed on a monitor screen of the monitor 64, and prior to the teaching, the component image is moved by operating the track ball 66, for alignment between the suction site of the electronic component and the vacuum nozzle on an image level.

Next, by taking various specially-shaped electronic components as examples, the component suction site teaching method will be described in detail with reference to FIGS. 3 to 9. As described above, in the control unit 6 of the embodiment, a graphical image of an end face of a vacuum nozzle is created based on nozzle type data concerning the nozzle. Therefore, the nozzle type data is explained, first. The nozzle type data is entered either by the use of the dedicated entry screen (touch panel 61) provided on the electronic component-mounting apparatus 1 or by the use of the general-purpose entry screen (external input device 65) provided separately from the apparatus 1. In the latter case, the entered data is introduced into the control unit 6 by communication or by using a recording medium, etc. The entered nozzle type data is managed under nozzle ID names each formed by a 4-character literal string, which are stored e.g. in component library data of electronic components corresponding thereto.

FIG. 3A shows an example of the data entry screen displayed on the touch panel 61 for entering nozzle type data, while FIG. 3B is a side view of a standard vacuum nozzle 9a, which is useful in explaining a method of entering nozzle type data. The nozzle 9a is comprised of a nozzle body 101, a diffusing plate 102 fitted on an upper end portion of the nozzle body 101 for diffusing light irradiated from below for the image-taking by the component-sensing camera 10, and a mounting portion 103 formed on an upper side of the plate 102. Further, the nozzle 9a is formed with a nozzle hole 104 which extends vertically through the nozzle 9a. There are various types of vacuum nozzles 9a which are different from each other in the number of the nozzle holes 104, the cross-sectional shape of the nozzle hole 104, the cross-sectional shape of the nozzle body 101, the length of the nozzle body 101, etc., and one of the types is selected in according with a shape of an electronic component to be picked up. However, the diffusing plate 102 and the mounting portion 103 are each identical in shape with a few exceptions.

First, as shown in FIG. 3A, "circle" or "rectangle" is entered for a data item "shape" to specify a shape of an end face of the nozzle body 101. The entry of "rectangle" has significance when an angle on a horizontal plane between an electronic component and the end face of the nozzle body 101 matters (which is described in detail hereinafter). Then, entered for the following item "nozzle length" is the length of the nozzle body 101, i.e. a dimension between an underside surface of the diffusing plate 102 and the lower end of the nozzle body 101. A transverse dimension (X) of the lower end face of the nozzle body 101 and a longitudinal dimension (Y) of the same are entered for an item "nozzle end outer dimensions". When "circle" is entered for the item "shape", an identical value is entered for the "X" and "Y" dimensions.

The following items "nozzle hole 1" to "nozzle hole 4" are provided to allow entry of data of four nozzle holes 104 at the maximum (when one vacuum nozzle is formed with a plurality of nozzle holes). For example, if the vacuum nozzle 9a has one nozzle hole 104, data of the nozzle hole 104 is entered for the item "nozzle hole 1" and if the nozzle 9a has two nozzle holes 104, data of the two nozzle holes 104 is entered for the items "nozzle hole 1" and "nozzle hole 2", respectively. The data entered for each of the items "nozzle hole 1" to "nozzle hole 4" is comprised of X and Y dimensions of a nozzle hole 104 and X and Y distances between a center of the end face of the vacuum nozzle 9a (i.e. an axis of the shaft (nozzle body 101) of the vacuum nozzle 9a) and a center of each nozzle hole 104. The X and Y distances define a location of the nozzle hole 104. An item "offset designation" is provided to enter X and Y values of an offset of the nozzle hole 104 (center of its lower open end) with respect to the axis of the vacuum nozzle 9a. Further, from the data entry screen, there are entered data for other items, such as "illuminating method", "lightness polarity", "end polarity (presence/absence)" and "size of V-shaped groove", which have no direct relevancy with the present invention.

Next, description will be made of the procedure for teaching a location of a suction site of an electronic component. The electronic component-mounting apparatus 1 is factory-adjusted before shipment from the factory by automatically teaching the location of a suction site of an electronic component by using a master cassette jig as a datum reference. Therefore, a normally-shaped electronic component which can be properly picked up even when slight displacement occurs between the location automatically taught and a location of a suction site of the component actually placed at the forward end of the tape cassette 17 is picked up based on the factory-set data. The teaching method described in detail hereinbelow is applied only to pickup of specially-shaped electronic components which cannot be picked up based on the factory-set data. Accordingly, "design values" of a location of a suction site of each electronic component, which is used in the following description, are not original design values (data) set during manufacturing of the apparatus 1, but the values (data) taught by the use of the master cassette jig, i.e. values obtained by adding an offset amount to the original values. Description of the teaching method using the master cassette jig is omitted.

FIG. 4A shows a surface-mount connector component S to be picked up, while FIG. 4B shows a corresponding vacuum nozzle 9a for picking up the component S. FIGS. 5A, 5B and FIGS. 6A, 6B each illustrate an image of a monitor screen, which is useful in explaining the teaching method. The connector component S is comprised of a case 201, numerous lead terminals 202 arranged on opposite longitudinal sides of the case 201, and numerous connector pins 203 arranged within the case 201. The connector pins 203 are longitudinally juxtaposed in a manner erected on the inside bottom of the case 201. The vacuum nozzle 9a has a nozzle body 101 formed with two nozzle holes 104, 104.

In picking up the connector component S by the vacuum nozzle 9a, the two nozzle holes 104 are inserted in the case 201 to respectively receive therein two connector pins arranged at a central portion of the connector component S, and then a bottom face of the case 201 on which the connector pins 203 are erected is sucked by the two nozzle holes 104. The distance between the two nozzle holes 104 is set to a common multiple of expected pitches pitch of connector pins 203 of a connector component S so as to assure general versatility of the nozzle 9a for various connector components S which are different in pitch from each other. This necessitates accurate alignment between the two connector pins 203 and the two nozzle holes 104.

Figure 5A:
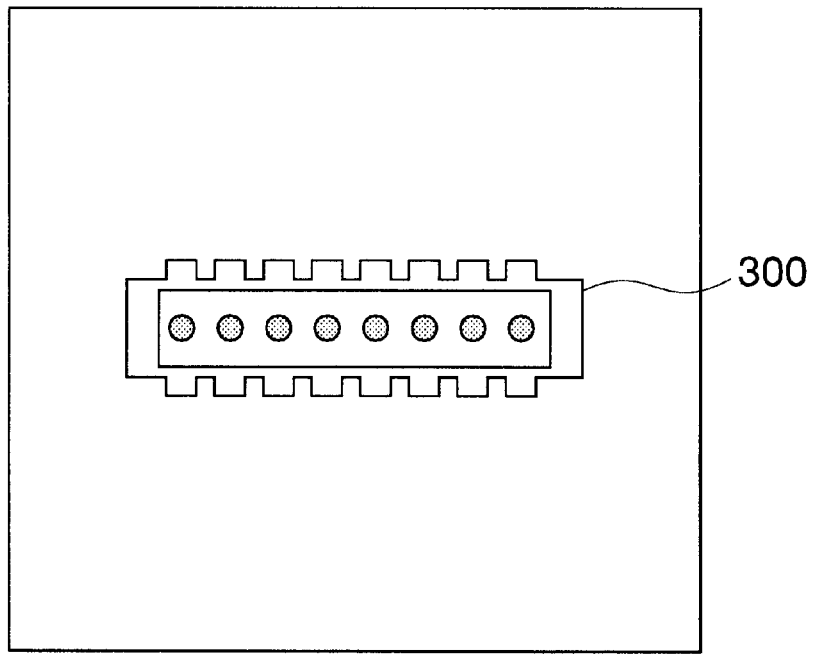
FIG. 5A shows a monitor screen with a captured component image displayed thereon, which is useful in explaining a first teaching method of the embodiment.
Figure 5B:
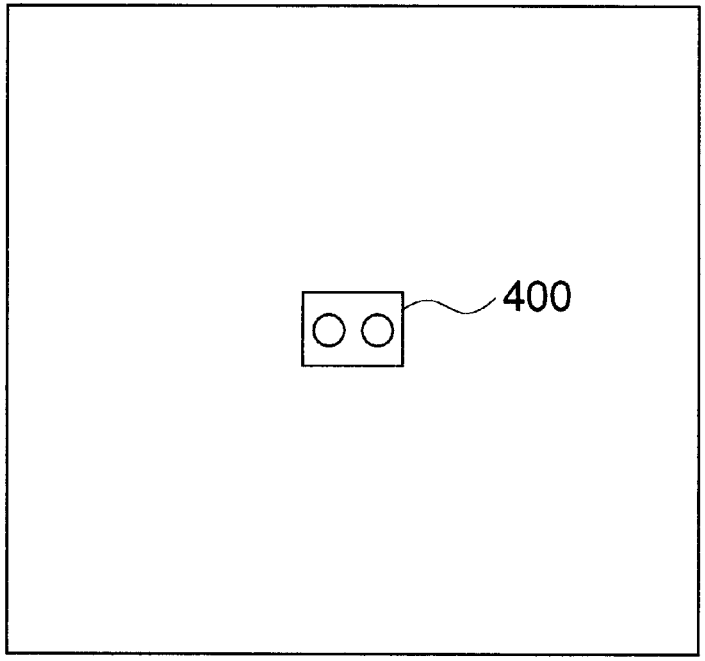
FIG. 5B shows the monitor screen with a created graphical image of a nozzle end face displayed thereon, which is useful in explaining the first teaching method.

FIG. 5A shows a monitor screen displaying an image of the connector component S taken by the board-sensing camera 8 when it is fed to the pickup position by the tape cassette 17 (the background is omitted). The board-sensing camera 8 is moved based on the design values, for image-taking of the connector component S, so that the component image 300 of the connector component S is displayed on screen with a sensing center of the camera 10 and a screen center of the monitor screen in agreement with each other. In the present description of the illustrated example, it is assumed that a component center of the component image 300 is slightly displaced from the screen center, though it is not noticeably shown in the figure. On the other hand, FIG. 5B shows a graphical image 400 of the end face of the vacuum nozzle 9a which is created based on the nozzle type data. This graphical image 400 is formed by an outline of the end face of the nozzle body 101 and outlines of the nozzle holes 104. In this case, the graphical image 400 is displayed with an image center thereof (more strictly, the axis of the shaft of the vacuum nozzle 9*a*) and the screen center in agreement with each other.

Figure 6A:
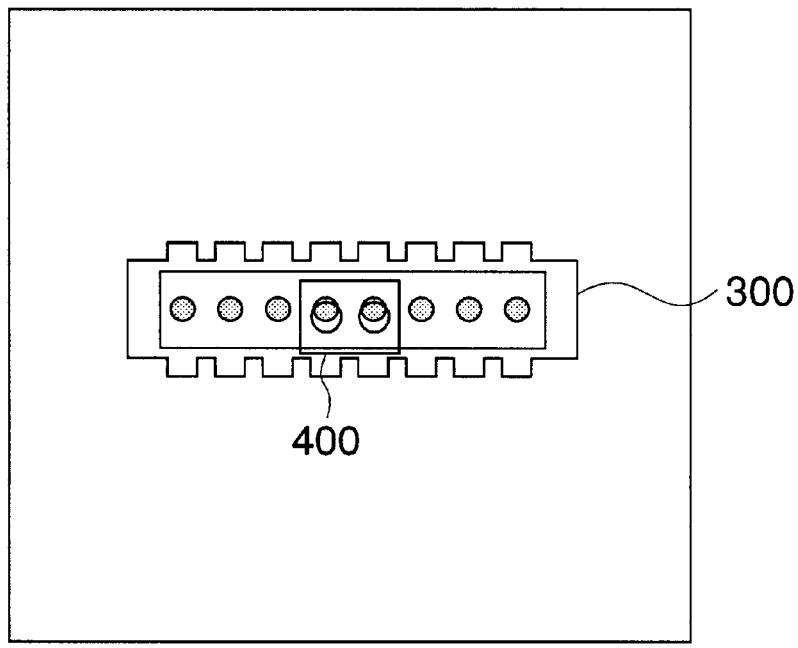
FIG. 6A shows the monitor screen on which the component image and the graphical image are displayed in a state before alignment, which is useful in explaining the first teaching method.
Figure 6B:
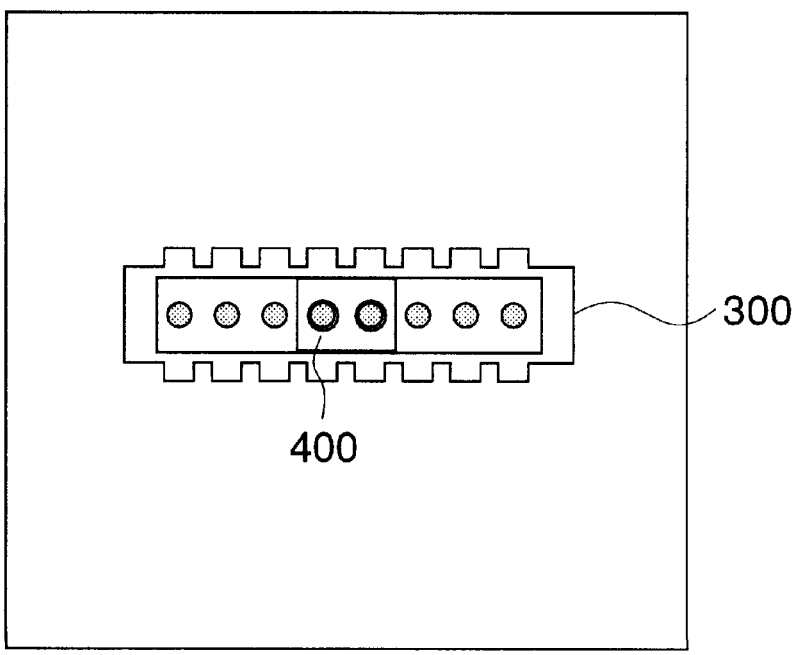
FIG. 6B shows the monitor screen on which the component image and the graphical image are displayed in a state after the alignment, which is useful in explaining the first teaching method.

FIG. 6A shows the FIG. 5A component image 300 and the FIG. 5B graphical image 400 displayed in a state superimposed one upon the other. In actual operation, a menu screen (data entry screen) of the touch panel 61 is switched sequentially in the order of a sub-menu screen, a teaching screen, and an operation screen, and then an ID number of a desired tape cassette 17 is selected for entry. Further, after designation of an option "central 1-point alignment", an operation button is depressed to thereby move the board-sensing camera 8 to capture an image of the connector component S to display the same on the monitor screen (i.e. image-taking is carried out). Thus, the monitor screen displays the image shown in FIG. 6A.

In this case, the component image 300 and the graphical image 400 represent the component S and the nozzle 9*a* to show the actual positional relationship therebetween in the present state. Therefore, the component image 300 is moved by operating the track ball 66 so as to carry out visual alignment between the two connector pins (image) of the component image 400 and the two nozzle holes (image) of the graphical image 400 (see FIG. 6B). When this alignment is completed, an execution key of the track ball 66 is operated for carrying out the teaching of the suction site. More specifically, results of the alignment are fed back to correct the design values. This teaching is carried out on the precondition that the electronic component S has a suction site thereof located at the center thereof, so that data given by the teaching defines the location of the suction site as well as that of the component center.

The graphical image 400 according to the embodiment is fixedly displayed in a manner such that the axis of the vacuum nozzle 9*a* agrees with the screen center (see FIG. 7A). Therefore, even if the nozzle 9*a* has its nozzle hole (center of the lower end) deviated or offset from the axis of the nozzle 9*a* as described above, the graphical image 400 of the nozzle 9*a* is displayed with the axis of the nozzle 9*a* in agreement with the screen center as shown in FIG. 7A.

Figure 8A:
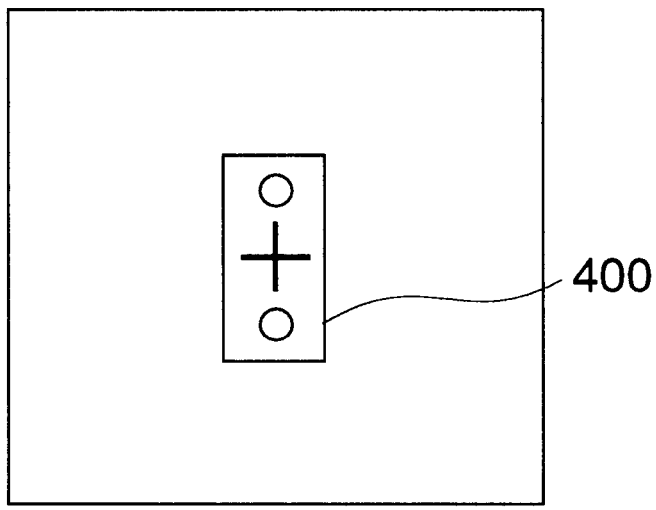
FIG. 8A shows the monitor screen displaying the graphical image appearing in FIG. 7A after rotation.
Figure 8B:
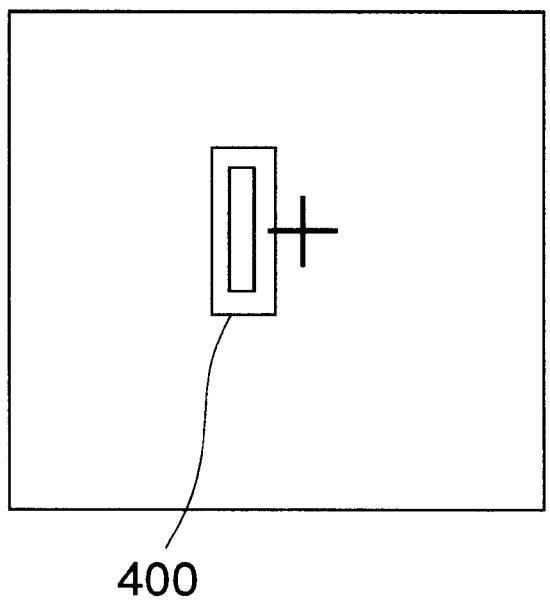
FIG. 8B shows the monitor screen displaying the graphical image appearing in FIG. 7B after rotation.

Further, when the vacuum nozzle 9*a* has its end face designated as "rectangle" for the "shape" item of the nozzle type data, the pickup angle of the nozzle 9*a* with respect to the electronic component S on the horizontal plane is restricted. Data designating the pickup angle is contained in the component library data. More specifically, although each electronic component S is usually supplied with longer sides thereof along the sides of the carrier tape such that it extends horizontally when viewed on the screen (horizontal orientation), when it is exceptionally supplied with shorter sides thereof along the sides of the carrier tape such that it extends vertically when viewed on the screen (vertical orientation), it is required to rotate the vacuum nozzle to change the original orientation thereof (horizontal orientation) to an orientation (vertical orientation) adapted to the vertical orientation of the component S, to pick up the same, so that a data item for this operation is contained in the component library data as "pickup angle designation". If the data is provided, the electronic component S fed to the pickup position in the vertical orientation has its image taken as it is and captured to be displayed on the monitor screen, while the graphical image 400 of the nozzle 9*a* is rotated to a position corresponding to the vertical orientation and then displayed as shown in FIGS. 8A and 8B. It is preferred that the apparatus is configured such that the component image 300 and the graphical image 400 can be zoomed in/out on the monitor screen so as to enhance the positioning accuracy.

Next, another teaching method will be described with reference to FIGS. 9A to 9D. When a connector component S is too large for a component image thereof to fit in the monitor screen (i.e. when the component image extends off the screen) as shown in FIG. 9A, an inconvenience can occur that it is impossible to identify two connector pins 203 to be used for alignment. More specifically, since the capture of the component image 300 for displaying on the monitor screen (for motion of the component-sensing camera) is performed based on the design values of the component center, displacement of more than half of a pitch between adjacent connector pins may occur between an actual component center and a position designated by the design values (design value-designated component center).

In this case, an option "diagonal 2-point-based alignment" is designated on the operation screen in place of the option "central 1-point alignment". In response to this designation of the option, a rotated L-shaped graphical image is displayed on the screen, and the track ball 66 is operated to carry out visual alignment of a corner of the rotated L-shaped graphical image with one of two diagonally opposed corners of the connector component S (i.e. the component image 300), as shown in FIG. 9B, followed by operating the execution key of the track ball (clicking). Then, another rotated L-shaped graphical image takes the place of the preceding one, and similar operation is carried out for visual alignment of the other of the two diagonally opposed corners with the other rotated L-shaped graphical image, as shown in FIG.9C, followed by operating the execution key of the track ball (clicking). Based on data obtained by these operations, the location of the center of the connector component S is calculated, and the connector component S has its image taken based on the calculated component center and captured to be displayed on the monitor screen. That is, the component image 300 is displayed with the component center thereof in agreement with the screen center. At the same time, the results of the calculation are fed back to the design values, i.e. taught to the apparatus 1.

Then, the option "central 1-point alignment" is designated on the operation screen, and the graphical image 400 is superimposed on the component image 300 so as to carry out alignment and teaching in response to the designation of the option "central 1-point alignment" as described hereinbefore (see FIG. 9D). In this case, the location of the component center has already been taught, so that the teaching carried out after designating the option "central 1-point alignment" is just for fine adjustment by which an error resulting from the option "diagonal 2-point-based alignment" is accommodated.

It should be noted that since the two points on the respective diagonally opposed corners are clicked on simply for calculation of the location of the component center, the points to be clicked on may not be those on the connector component as shown in FIGS. 9B, 9C, but diagonally opposed corners of a component-holding recess formed on the carrier tape. Further, when the vacuum nozzle is constructed to have a large size so as to be adapted to a large electronic component S and hence the graphical image 400 outstretches the monitor screen, it is preferred that only an image of the nozzle holes is automatically displayed as the graphical image of the nozzle. Of course, the teaching method based on the designation of the option "diagonal 2-point-based alignment" can also be applied to cases of picking up small electronic components S.

As described above, there can be cases where an electronic component S has asperities or the like formed at a component center thereof, and hence a suction site thereof is offset from the component center. In picking up a component S of this type, if the component image 300 of the component S is captured to be displayed on the monitor screen without any change in settings, the component image 300 is displayed with the off-center suction site in agreement with the screen center. Therefore, although the teaching of a location of the suction site can be carried out as properly as ever, it is difficult to teach a location of the component center. Moreover, portions of the electronic component S may spread out of the field of view of the board-sensing camera 8.

However, the two teaching methods described with reference to FIGS. 5A, 5B and 6A, 6B, and FIGS. 9A to 9D can be applied to the case of picking up the electronic component S of the above-mentioned type. Information of the offset of the suction site from the component center and an amount of the offset is stored in the component library data in advance. Therefore, in the two teaching methods, an option "off-center suction" is designated on the operation screen, which is not illustrated in the figures. In the teaching method shown in FIGS. 5A, 5B and 6A, 6B, when the above option is designated, offset data contained in the component library data is canceled, and the board-sensing camera 8 captures the component image 300 of the electronic component S, based on design values of the location of the component center. Then, the track ball 66 is operated to carry out alignment between the component center of the component image 300 and the screen center and then results of the alignment are taught to the apparatus 1. Thus, the location of the actual component center of the electronic component S is taught. It should be noted that in the teaching method shown in FIGS. 9A to 9D, the same procedure of operations as described hereinbefore is followed, except for designation of the option "off-center suction". After the teaching of the location of the component center is completed, the option "central 1-point alignment" is designated on the operation screen similarly to the case described hereinbefore, and the graphical image 400 is superimposed on the component image 300 so as to carry out the alignment and teaching. As a result of the teaching, the offset data contained in the component library data is updated based data thus obtained concerning the electronic component S actually supplied to the pickup position. For this update of the offset data, it is required to not only designate the option "off-center suction" but also select "execute" for an item "follow-up correction of pickup position". In this case, if the location of the component center is not taught in the operation, the apparatus 1 delivers on error message indicative of failure of execution of designated options.

The location of the suction site may be taught directly by designating the option "central 1-point alignment", without carrying out the teaching of the location of the component center. In this case, update of the offset data is not allowed, so that "inhibit" is designated for the item "follow-up correction of pickup position". Here, designation of the option "off-center suction" is not required.

As described above, according to the present embodiment, the component image 300 of the electronic component S actually supplied to the pickup position is captured to be displayed on the monitor screen, and then the graphical image 400 of the corresponding vacuum nozzle generated separately from the component image 300 is superimposed on the component image 300 for alignment between the two images, and the results of the alignment are taught in a feedback manner. Therefore, it is possible to carry out simple and speedy operation for teaching the location of the suction site of the component S with extremely high accuracy.

Although in the above embodiment, the connector component is taken as an example representative of various specially-shaped electronic components, it goes without saying that this invention can be applied to pickup of other electronic components having respective small suction sites.

It is further understood by those skilled in the art that the foregoing is a preferred embodiment of the invention, and that various changes and modification may be made without departing from the spirit and scope thereof.

What is claimed is:

1. A component suction site-teaching system for an electronic component-mounting apparatus including a vacuum nozzle having a nozzle end face for picking up an electronic component thereat by vacuum, the component suction site-teaching system comprising:

nozzle moving means for moving said vacuum nozzle in directions of X axis and Y axis;

image taking means for taking an image of said electronic component set at a pickup position;

image creating means for creating a graphical image of said nozzle end face of said vacuum nozzle from shape data of said vacuum nozzle;

display means for displaying on a screen thereof said image of said electronic component taken by said image taking means and said graphical image of said nozzle end face created by said image creating means, such that said graphical image of said nozzle end face is superimposed on said image of said electronic component;

image control means for moving said image of said electronic component and said graphical image of said nozzle end face relative to each other on said screen of said display means, thereby effecting alignment of said graphical image of said nozzle end face with an image of a predetermined site of said electronic component; and suction site-teaching means for teaching to said nozzle moving means a location of said predetermined site of said electronic component said image of which has been aligned with said graphical image of said nozzle end face by said image control means, as a location of a suction site of said electronic component to be sucked by said vacuum nozzle.

2. A component suction site-teaching system according to claim 1, further comprising image-taking center-designating means for designating a design value-designated component center of said electronic component as a center of a field of view of said image taking means when said image taking means takes said image of said electronic component, if there is a fear that an image of said electronic component taken by said image taking means with said center of said field of view of said image taking means set to a design value-designated suction site center of said electronic component may extend off said field of view of said image taking means.

3. A component suction site-teaching system according to claim 2, wherein said image control means includes center aligning means for moving, on said screen of said display means, said image of said electronic component taken with said center of said field of view of said image taking means set to said design value-designated component center designated by said image-taking center-designating means, thereby effecting alignment between a center of said image of said electronic component and a center of said screen, and wherein said suction site-teaching means teaches to said nozzle moving means said center of said image of said electronic component which is aligned with said center of said screen by said image control means as an actual component center of said electronic component.

4. A component suction site-teaching system according to claim 1, further comprising component center-calculating means for causing said image taking means to take images of two points at respective diagonally opposed corners of said electronic component, calculating a location of said component center of said electronic component from results of the image-taking of said two points, and then causing said image taking means to take said image of said electronic component with said center of said field of view of said image taking means set to said component center of said electronic component said location of which is determined by the calculation, if there is a fear that an image of said electronic component taken by said image taking means with said center of said field of view thereof set to a design value-designated suction site center of said electronic component may extend off said field of view of said image taking means.

5. A component suction site-teaching system according to claim 4, wherein said suction site-teaching means teaches said location of said component center calculated by said component center-calculating means to said nozzle moving means as an actual component center of said electronic component.

6. A component suction site-teaching system according to claim 1, wherein said graphical image of said nozzle end face is fixedly displayed in a central portion of said screen, and wherein said image control means positions said image of said electronic component with respect to said graphical image of said nozzle end face, for said alignment.

7. A component suction site-teaching system according to claim 6, wherein said graphical image of said nozzle end face is displayed such that a point on said graphical image corresponding in location to an axis of said vacuum nozzle agrees with said center of said display screen.

8. A component suction site-teaching system according to claim 1, wherein said graphical image of said nozzle end face is formed by at least one of an outline of said nozzle end face and an outline of a nozzle hole.

9. A component suction site-teaching system according to claim 1, wherein said display means is capable of zooming in/out said image of said vacuum nozzle and said graphical image of said electronic component.

10. A component suction site-teaching system according to claim 1, further comprising nozzle angle-designating means for designating a predetermined angle of rotation of said vacuum nozzle when said vacuum nozzle is required to be rotated through said predetermined angle about an axis thereof to pick up said electronic component, and wherein said display means displays said graphical image of said nozzle end face after rotating said graphical image of said nozzle end face relative to said image of said electronic component through said predetermined angle designated by said nozzle angle-designating means.

11. A component suction site-teaching system according to claim 1, wherein if said nozzle end face is too large for said graphical image thereof to be displayed within said screen of said display means assuming that said display means displays an outline of said nozzle end face, said display means displays only an outline of a nozzle hole of said vacuum nozzle on said screen thereof.

12. A method of teaching a suction site of an electronic component to be picked up by vacuum by a vacuum nozzle, the method comprising the steps of:

taking an image of said electronic component set at a pickup position;

creating a graphical image of a nozzle end face of said vacuum nozzle corresponding to said electronic component from shape data of said vacuum nozzle;

displaying said image of said electronic component and said graphical image of said nozzle end face on a screen, such that said graphical image of said nozzle end face is superimposed on said image of said electronic component;

moving said image of said electronic component and said graphical image of said nozzle end face relative to each other on said screen, thereby effecting alignment of said graphical image of said nozzle end face with an image of a predetermined site of said electronic component; and teaching a location of said predetermined site of said electronic component said image of which site has been aligned with said graphical image of said nozzle end face, as a location of a suction site of said electronic component to be sucked by said vacuum nozzle, to nozzle moving means for moving said vacuum nozzle.

* * * * *